(12) United States Patent
Hyoki et al.

(10) Patent No.: US 8,867,095 B2
(45) Date of Patent: Oct. 21, 2014

(54) PRINTING SYSTEM AND IMAGE FORMING APPARATUS INCLUDING DEFECT DETECTION

(75) Inventors: Kenji Hyoki, Kanagawa (JP); Toshiyuki Kazama, Kanagawa (JP); Masaki Fujise, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 176 days.

(21) Appl. No.: 13/561,582

(22) Filed: Jul. 30, 2012

(65) Prior Publication Data

US 2013/0222823 A1 Aug. 29, 2013

(30) Foreign Application Priority Data

Feb. 29, 2012 (JP) .................................. 2012-043289

(51) Int. Cl.
*H04N 1/60* (2006.01)
(52) U.S. Cl.
USPC ............. 358/1.9; 358/1.2; 358/1.6; 358/1.13; 358/1.15; 358/1.16; 358/474; 358/504; 358/505; 358/518
(58) Field of Classification Search
None
See application file for complete search history.

(56) References Cited

U.S. PATENT DOCUMENTS

| 7,965,414 B2 * | 6/2011 | Wu et al. ........................ 358/1.9 |
| 8,116,585 B2 * | 2/2012 | Wu et al. ........................ 382/275 |
| 8,542,418 B2 * | 9/2013 | Chandu et al. ................ 358/504 |
| 2003/0164968 A1 | 9/2003 | Lida |
| 2004/0080763 A1 * | 4/2004 | Kanno ........................... 358/1.9 |
| 2005/0041835 A1 * | 2/2005 | Reed et al. .................... 382/100 |
| 2006/0110009 A1 * | 5/2006 | Klassen et al. ................ 382/112 |
| 2007/0103707 A1 * | 5/2007 | Klassen ......................... 358/1.9 |
| 2008/0204829 A1 * | 8/2008 | Harrington .................... 358/504 |
| 2013/0235396 A1 * | 9/2013 | Hyoki et al. ................... 358/1.9 |

FOREIGN PATENT DOCUMENTS

| JP | 2001-291093 A | 10/2001 |
| JP | 2004-23738 A | 1/2004 |
| JP | 2007-033247 A | 2/2007 |
| JP | 2010-187414 A | 8/2010 |
| JP | 4653340 A | 3/2011 |

* cited by examiner

Primary Examiner — Miya J Cato
(74) Attorney, Agent, or Firm — Sughrue Mion, PLLC

(57) ABSTRACT

A printing system includes the following elements. An image forming unit forms an image. An image reader reads an image. A first color converter creates second image data. A second color converter creates fourth image data. A determining unit determines whether a pixel value of each of pixels in the first image data or the second image data is located inside or outside an input color gamut that is readable by the image reader. A correction unit corrects pixels located at the same position as a pixel having a pixel value located outside the input color gamut. An inspection unit performs inspection to find a defect of an image. The correction unit performs correction on the pixels located at the same position as a pixel having a pixel value located outside the input color gamut so that the inspection unit does not detect a difference between the corrected pixels.

5 Claims, 17 Drawing Sheets

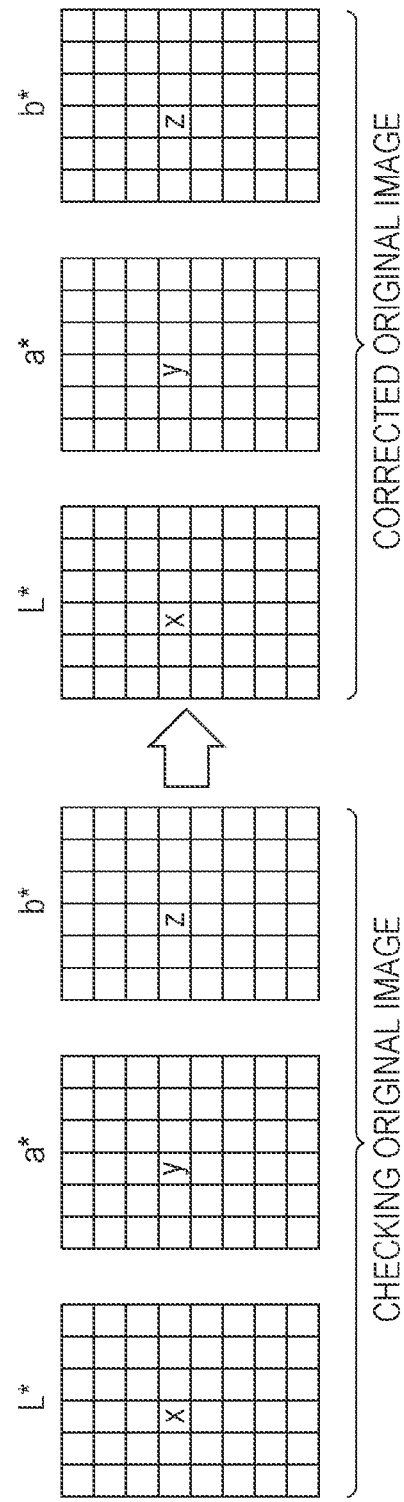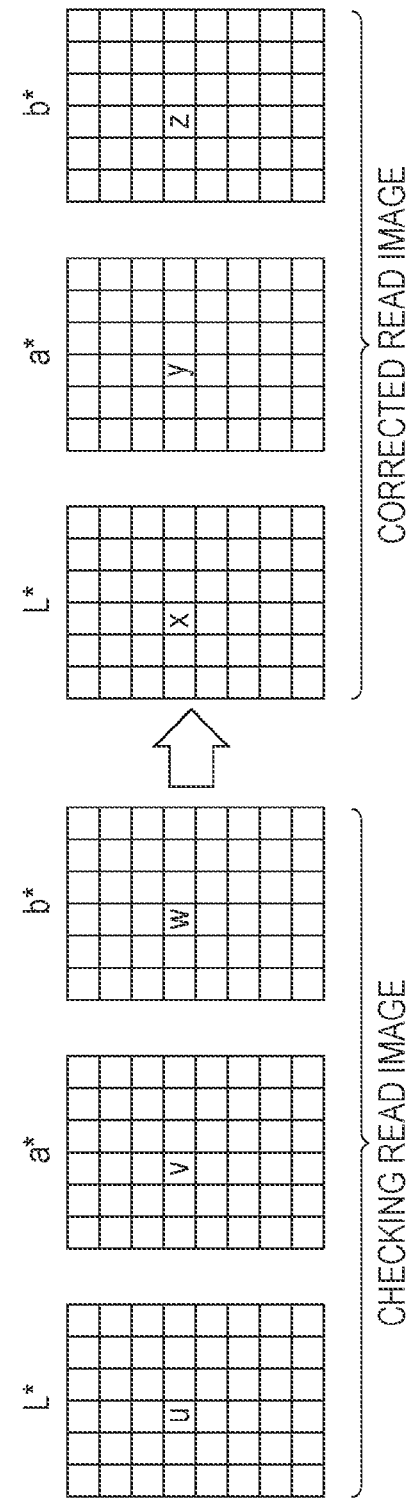

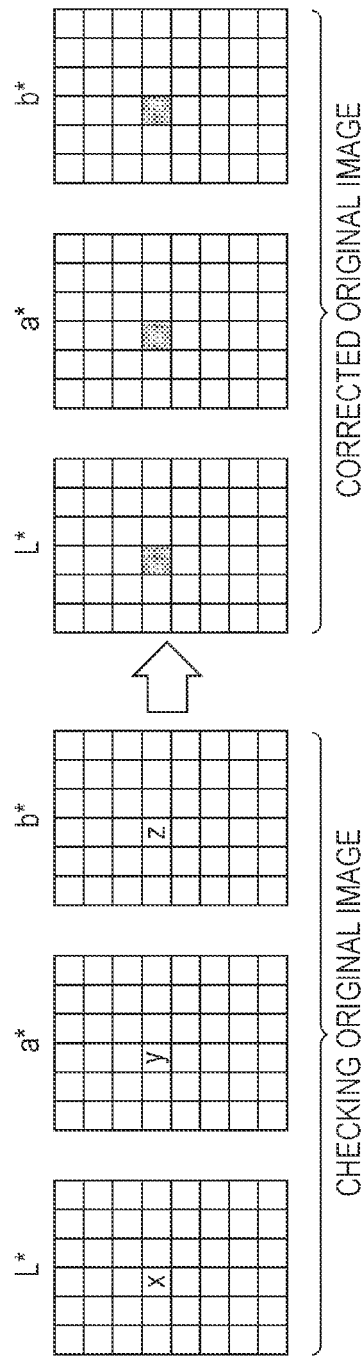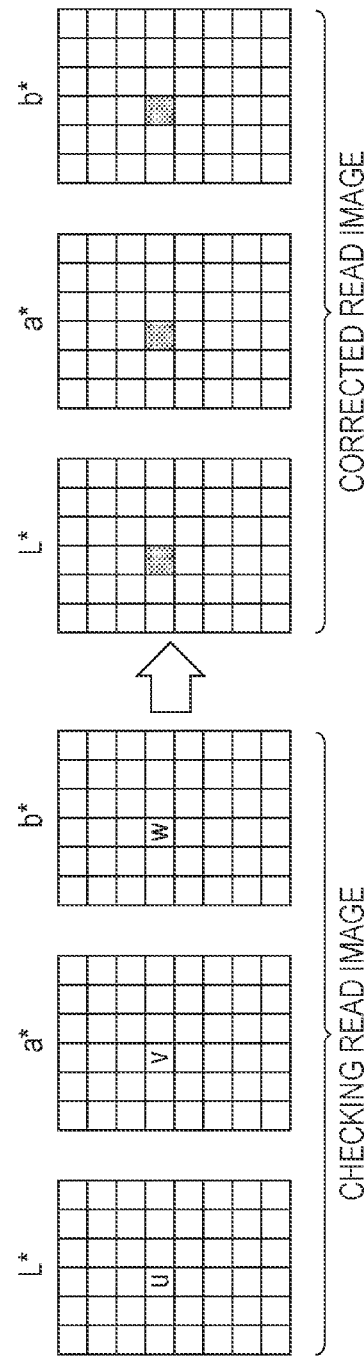

CHECKING ORIGINAL IMAGE

CHECKING READ IMAGE

DIFFERENCE IMAGE

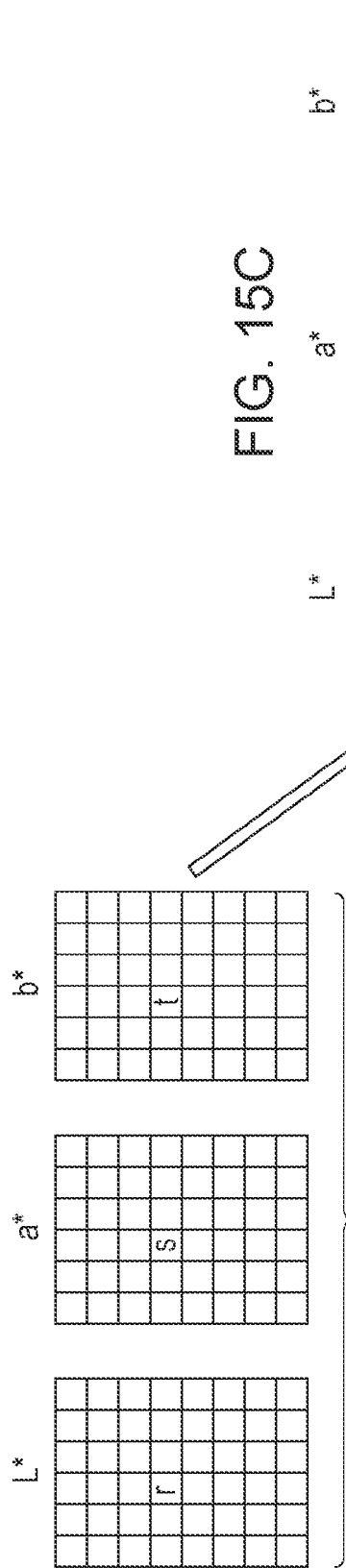
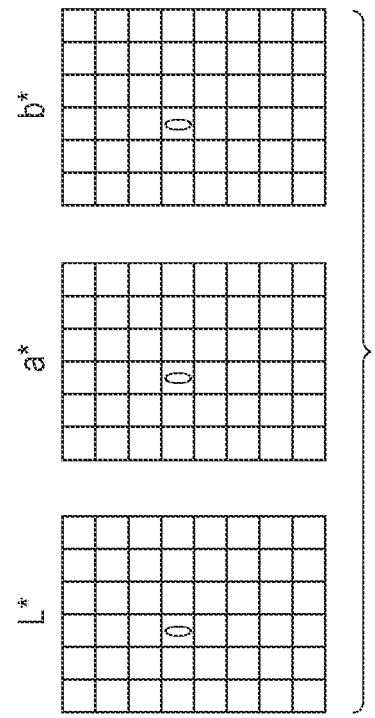
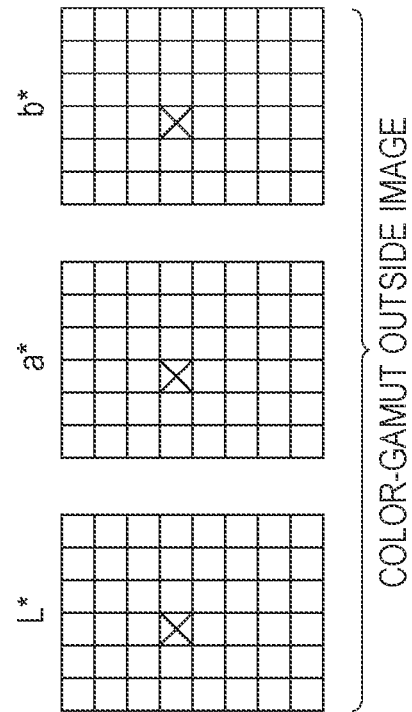

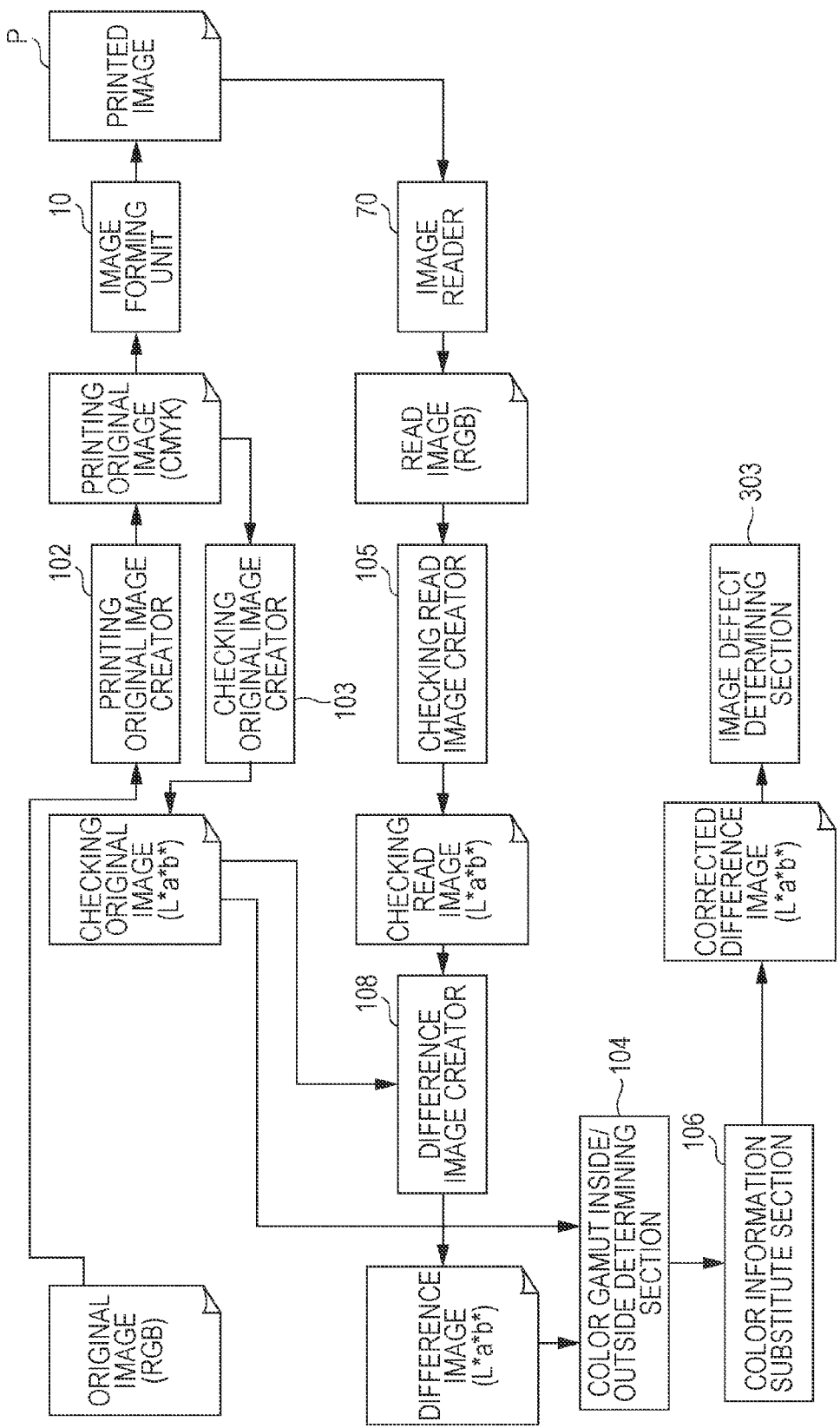

PRINTING SYSTEM AND IMAGE FORMING APPARATUS INCLUDING DEFECT DETECTION

CROSS-REFERENCE TO RELATED APPLICATIONS

This application is based on and claims priority under 35 USC 119 from Japanese Patent Application No. 2012-043289 filed Feb. 29, 2012.

BACKGROUND

1. Technical Field

The present invention relates to a printing system and an image forming apparatus and method.

2. Summary

According to an aspect of the invention, there is provided a printing system including: an image forming unit that forms an image on a recording medium by using plural color materials corresponding to a first color space; an image reader that reads the image formed on the recording medium by the image forming unit in a second color space, which is different from the first color space; a first color converter that creates second image data by converting a color space of first image data used for forming an image using the image forming unit into a third color space, a reproduction color gamut of the third color space being wider than a reproduction color gamut of the first color space and a reproduction color gamut of the second color space; a second color converter that creates fourth image data by converting a color space of third image data, which is obtained as a result of reading an image by using the image reader, from the second color space to the third color space; a determining unit that determines whether a pixel value of each of pixels of an image represented by the first image data or the second image data is located inside or outside an input color gamut that is readable by the image reader; a correction unit that corrects, among the pixels of the image represented by the second image data and pixels of an image represented by the fourth image data, both of the second image data and the fourth image data being obtained on the basis of the first image data, pixels located at the same position as a pixel having a pixel value which is determined to be located outside the input color gamut by the determining unit; and an inspection unit that performs inspection to find a defect of an image formed on the recording medium by the image forming unit, by checking each of pixels of an image represented by fifth image data obtained as a result of correcting the second image data by using the correction unit against the associated pixel of an image represented by sixth image data obtained as a result of correcting the fourth image data by using the correction unit. The correction unit performs correction, among the pixels of the image represented by the second image data and the pixels of the image represented by the fourth image data, on the pixels located at the same position as the pixel having the pixel value which is determined to be located outside the input color gamut by the determining unit so that the inspection unit does not detect a difference between the corrected pixels.

BRIEF DESCRIPTION OF THE DRAWINGS

Exemplary embodiments of the present invention will be described in detail based on the following figures, wherein:

FIGS. 8A and 8B illustrate the content of processing performed by a color information substitute section according to the first exemplary embodiment;

FIGS. 10A and 10B illustrate the content of processing performed by an excluded-pixel setting section according to the second exemplary embodiment;

FIGS. 15A through 15C illustrate the content of processing performed by a color information substitute section according to the third exemplary embodiment;

FIG. 17 illustrates a printing/inspecting procedure in a printing system of a modified example of the third exemplary embodiment.

DETAILED DESCRIPTION

Exemplary embodiments of the present invention will be described below in detail with reference to the accompanying drawings.

First Exemplary Embodiment

Figure 1:
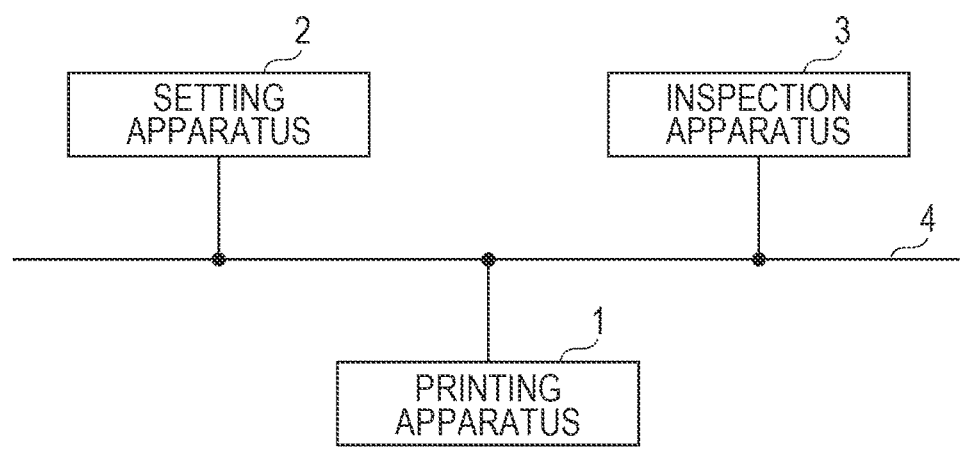
FIG. 1 illustrates the configuration of a printing system according to an exemplary embodiment.

FIG. 1 illustrates the configuration of a printing system according to an exemplary embodiment.

The printing system of the first exemplary embodiment includes a printing apparatus 1, a setting apparatus 2, an inspection apparatus 3, and a network 4. The printing apparatus 1 prints an image on a sheet of paper. The setting apparatus 2 sets image data (original image data) representing an image to be printed by the printing apparatus 1 and also sets printing conditions for the image data. The inspection apparatus 3 inspects the content of an image printed on a sheet of paper (printed image) by the printing apparatus 1. The network 4 connects the printing apparatus 1, the setting apparatus 2, and the inspection apparatus 3.

Figure 2:
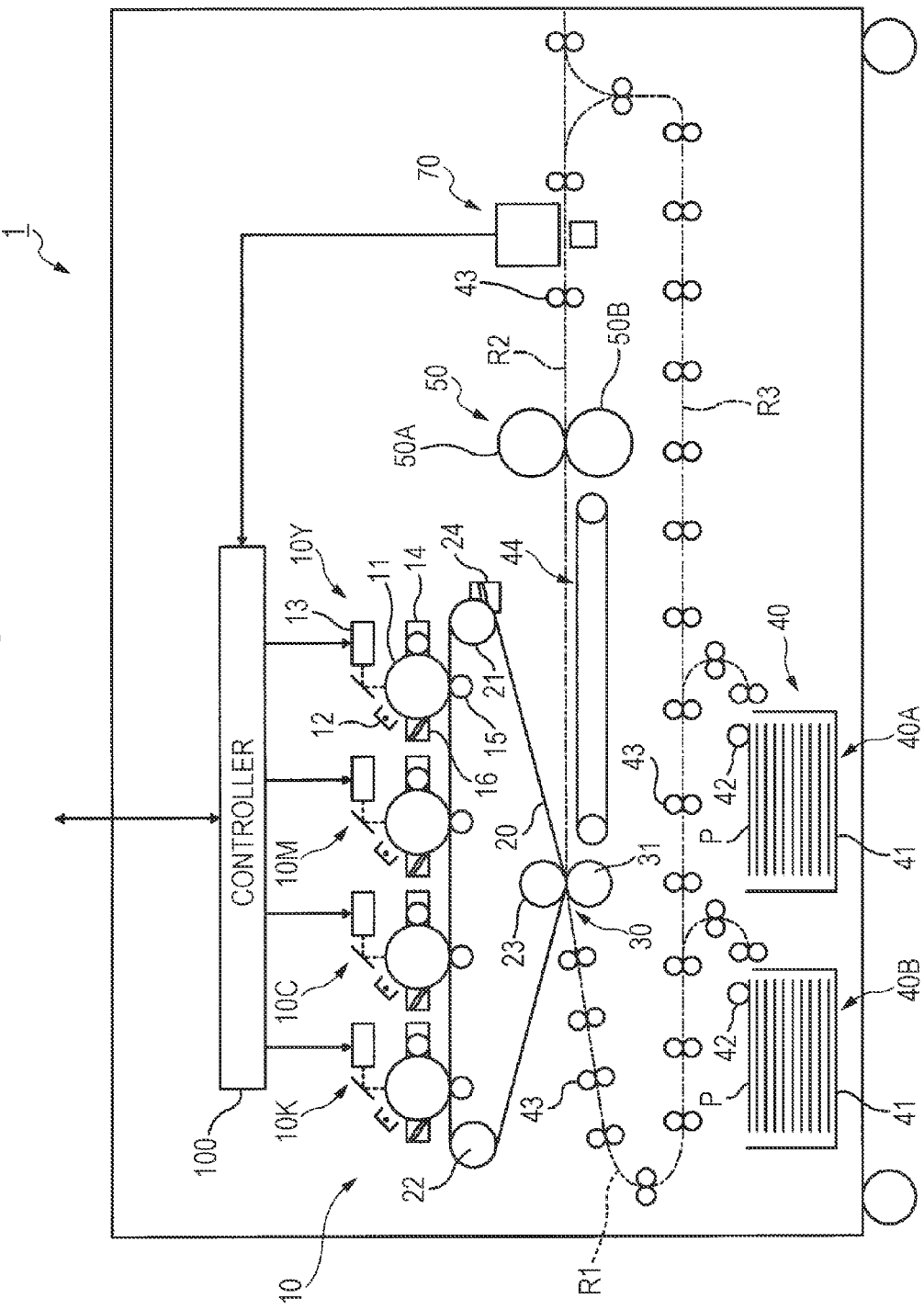
FIG. 2 illustrates the configuration of a printing apparatus.

FIG. 2 illustrates the configuration of the printing apparatus 1. The printing apparatus 1 of the first exemplary embodiment is a direct-to-press printing apparatus that prints images by using an electrophotographic system (i.e., a printer which does not use printing plates).

The printing apparatus 1 is a so-called tandem printing apparatus, and includes plural image forming units 10Y, 10M, 10C, and 10K that form toner images of the associated color components (yellow, magenta, cyan, and black, respectively). The printing apparatus 1 also includes a controller 100. The controller 100 includes a central processing unit (CPU), a read only memory (ROM), a random access memory (RAM), etc., and controls individual elements forming the printing apparatus 1 and operations (including image processing) performed by the individual elements.

The printing apparatus 1 also includes an intermediate transfer belt 20 and a second transfer device 30. Toner images of the individual color components formed by the image forming units 10Y, 10M, 10C, and 10K are sequentially transferred to and held on the intermediate transfer belt 20 (first transfer operation). The second transfer device 30 simultaneously transfers the toner images held on the intermediate transfer belt 20 onto a sheet of paper P formed in a rectangular shape, which is an example of a recording medium (second transfer operation).

The plural image forming units 10Y, 10M, 10C, and 10K each include a photoconductor drum 11, which is rotatably attached to the associated image forming unit. The image forming units 10Y, 10M, 10C, and 10K also each include, around the photoconductor drum 11, a charging device 12, an exposure device 13, and a developing device 14. The charging device 12 is disposed on the periphery of the photoconductor drum 11 and charges the photoconductor drum 11. The exposure device 13 exposes the photoconductor drum 11 to light and thereby forms an electrostatic latent image on the photoconductor drum 11. The developing device 14 visualizes the electrostatic latent image formed on the photoconductor drum 11 by using the associated color of toner so as to form a toner image. The image forming units 10Y, 10M, 10C, and 10K also each include a first transfer device 15 and a drum cleaner 16. The first transfer device 15 transfers the associated color of toner image formed on the photoconductor drum 11 onto the intermediate transfer belt 20. The drum cleaner 16 removes toner remaining on the photoconductor drum 11 which has not been transferred to the intermediate transfer belt 20.

The intermediate transfer belt 20 is rotatably stretched along three roller members 21, 22, and 23, which are also rotatably provided. Among the three roller members 21, 22, and 23, the roller member 22 drives the intermediate transfer belt 20. The roller member 23 opposes a second transfer roller 31 with the intermediate transfer belt 20 therebetween. The second transfer roller 31 and the roller member 23 form the second transfer device 30. A belt cleaner 24, which removes toner remaining on the intermediate transfer belt 20 which has not been transferred to a recording medium, is provided at a position at which the belt cleaner 24 opposes the roller member 21 with the intermediate transfer belt 20 therebetween.

The printing apparatus 1 includes a first transport path R1, a second transport path R2, and a third transport path R3. Sheets P pass through the first transport path R1 and are transported to the second transfer device 30. After passing through the second transfer device 30, the sheets P pass through the second transport path R2. The third transport path R3 branches off from the second transport path R2 on the farther downstream side than a fixing device (discussed later) and extends to under the first transport path R1. The sheets P pass through the third transport path R3 and are transported back to the first transport path R1. Sheets that have been transported along the second transport path R2 and that are not guided to the third transport path R3 are discharged to outside the printing apparatus 1 and are stacked on a sheet stacking portion (not shown).

The printing apparatus 1 also includes a sheet transport unit 40 that transports sheets P along the first transport path R1, the second transport path R2, and the third transport path R3. The sheet transport unit 40 includes a first sheet supply device 40A and a second sheet supply device 40B. The first sheet supply device 40A supplies sheets P to the first transport path R1. The second sheet supply device 40B is disposed on the farther downstream side than the first sheet supply device 40A in the transport direction of sheets P, and supplies sheets P to the first transport path R1. The first and second sheet supply devices 40A and 40B have the same structure, and each include a sheet storage portion 41 in which sheets P are stored and an extracting roller 42 which extracts sheets P stored in the sheet storage portion 41 and which transports the extracted sheets P. In the first and second sheet supply devices 40A and 40B, different types, sizes, and orientations of sheets P may be stored.

The sheet transport unit 40 includes plural transport rollers 43 provided along the first, second, and third transport paths R1, R2, and R3. The plural transport rollers 43 sandwich sheets P therebetween and transport the sheets P. The sheet transport unit 40 also includes a belt transport unit 44 which is provided on the second transport path R2. The belt transport unit 44 transports sheets P passing through the second transfer device 30 to the fixing device 50.

The printing apparatus 1 also includes the fixing device 50 provided on the second transport path R2. The fixing device 50 fixes an image, which has been transferred onto a sheet P by the second transfer device 30, on the sheet P. The fixing device 50 includes a heating roller 50A which is heated by a built-in heater (not shown) and a pressing roller 50B which presses the heating roller 50A. In this fixing device 50, a sheet P passes between the heating roller 50A and the pressing roller 50B and is heated and pressed, thereby fixing the image on the sheet P.

In the following description, the above-described image forming units 10Y, 10M, 10C, and 10K, the intermediate transfer belt 20, the second transfer device 30, the sheet transport unit 40, and the fixing device 50 will be referred to as an "image forming unit 10". The image forming unit 10 of the first exemplary embodiment serves as an example of an image forming unit.

In the printing apparatus 1 of the first exemplary embodiment, an image may be printed on a first side of a sheet P supplied from, for example, the first sheet supply device 40A, and another image may also be printed on a second side of the sheet P. More specifically, in the printing apparatus 1, after an image is transferred onto the first side of the sheet P and passes through the fixing device 50, the front and back sides (first and second sides) of the sheet P are reversed while passing through the third transport path R3, and the sheet P is then supplied back to the second transfer device 30. Then, an image is transferred onto the second side of the sheet P in the second transfer device 30. Subsequently, the sheet P passes through the fixing device 50 again and the image transferred onto the sheet P is fixed on the sheet P. With this operation, an image may be formed on the first side of a sheet P, and another image may be formed on the second side of the sheet P.

In the printing apparatus 1, an image reader 70 is disposed on the second transport path R2 on the farther downstream side than the fixing device 50 in the transport direction of sheets P and on the farther upstream side than a portion at which the third transport path R3 branches off from the second transport path R2 in the transport direction of sheets P.

The image reader 70, which serves as an example of an image reader, reads an image printed on a sheet P subjected to a second transfer operation and a fixing operation in the second transfer device 30 and the fixing device 50, respectively. The image reader 70 reads an image printed on the side of the sheet P which opposes the intermediate transfer belt 20, i.e., an image on the side of the sheet P subjected to a second transfer operation in the second transfer device 30. The image reader 70 includes three line sensors (not shown) which are disposed in a direction intersecting with the transport direction of sheets P and which read red (R), green (G), and blue (B) images. The line sensors read one side of the sheet P line by line. The image reader 70 is not restricted to line sensors, and may be another type of sensor, such as a two-dimensional area sensor that reads RGB color images.

Figure 3:
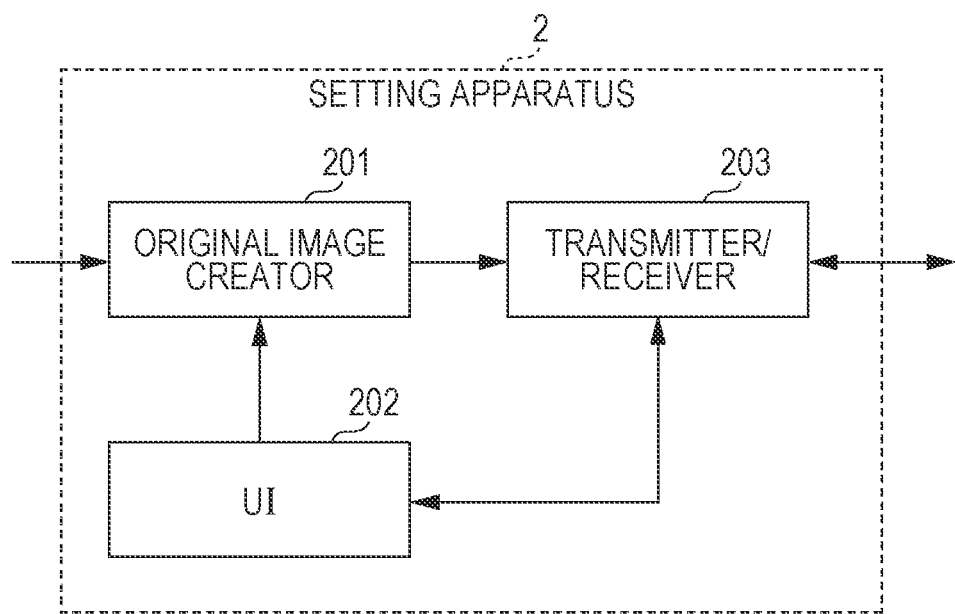
FIG. 3 is a block diagram illustrating the functional configuration of a setting apparatus.

FIG. 3 is a block diagram illustrating the functional configuration of the setting apparatus 2 shown in FIG. 1. The fixing apparatus 2 is constituted by a computer including a CPU, a ROM, a RAM, etc. The setting apparatus 2 is a so-called digital front end (DFE) that performs data processing on data, which is to be input into the printing apparatus 1, when executing a job of continuously printing images on one or plural sheets P in response to one instruction.

The setting apparatus 2 includes an original image creator 201, a user interface (UI) 202, and a transmitter/receiver 203.

On the basis of input image data input from an external source, the original image creator 201 creates "original image data", which is an example of first image data, that can be interpreted by the printing apparatus 1.

The UI 202 receives input of various settings which are necessary for performing printing by the printing apparatus 1 on the basis of the original image data. Examples of the various settings received via the UI 202 are a setting for a color space used for defining the original image data, a setting for the resolution used for performing printing on the basis of the original image data, etc. However, there may be some cases where information concerning the color space and the resolution is already included in input image data. In the following description, the color space of original image data will be referred to as a "set color space", and the resolution of original image data will be referred to as a "set resolution". In this example, the set color space is defined in an RGB color space. The UI 202 displays, on a display (not shown), images represented by data sent from the printing apparatus 1 or the inspection apparatus 3 via the network 4.

The transmitter/receiver 203 transmits and receives various items of data to and from the printing apparatus 1 or the inspection apparatus 3 shown in FIG. 1 via the network 4.

Figure 4:
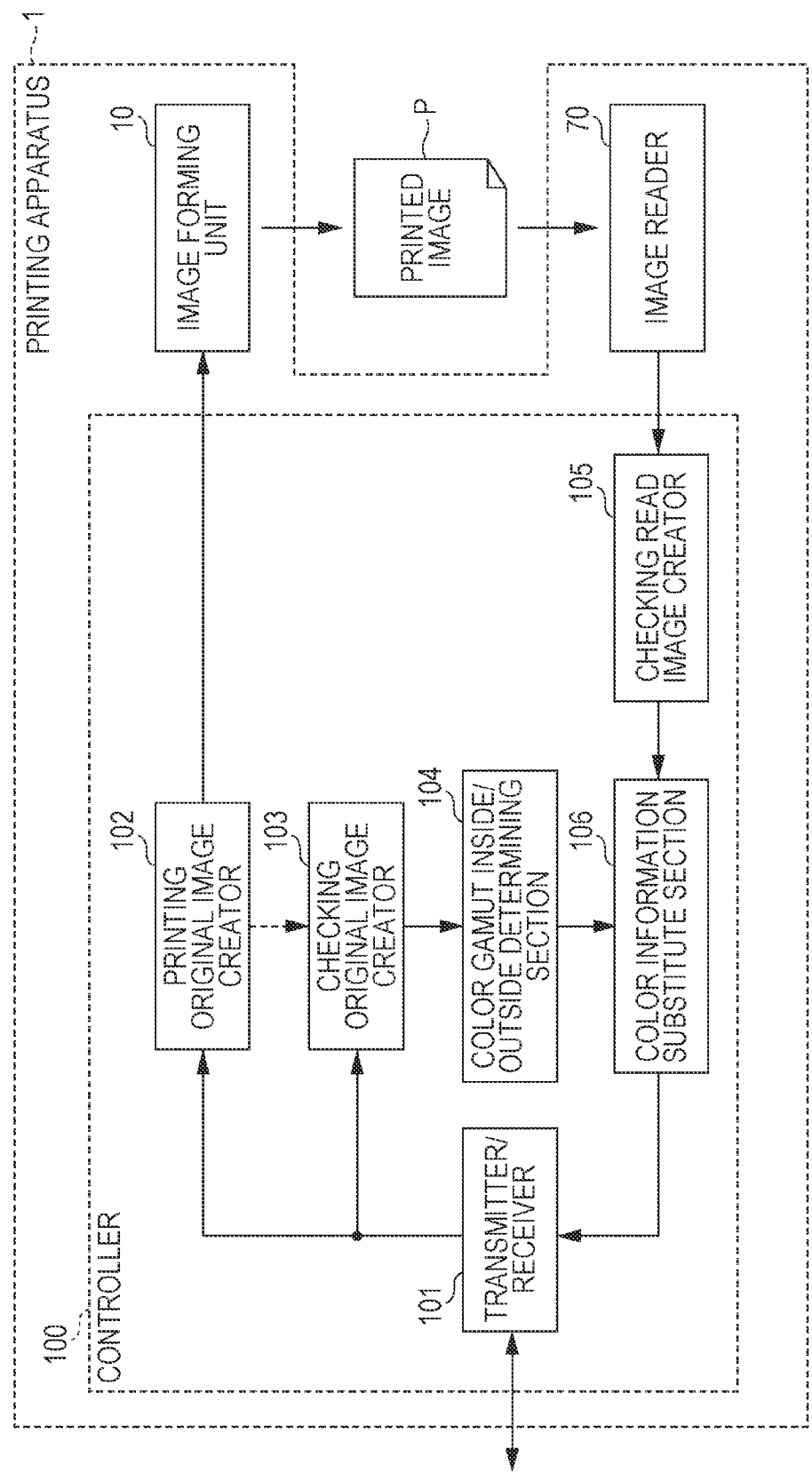
FIG. 4 is a block diagram illustrating the functional configuration of a printing apparatus according to a first exemplary embodiment.

FIG. 4 is a block diagram illustrating the functional configuration of the printing apparatus 1 shown in FIGS. 1 and 2.

The printing apparatus 1 of the first exemplary embodiment includes the image forming unit 10 that forms an image on a sheet P, the image reader 70 that reads an image printed on a sheet P, and the controller 100 that controls the image forming unit 10 and the image reader 70. The controller 100 includes a transmitter/receiver 101, a printing original image creator 102, a checking original image creator 103, a color gamut inside/outside determining section 104, a checking read image creator 105, and a color information substitute section 106.

The transmitter/receiver 101, which is an example of an output unit, transmits and receives various items of data to and from the setting apparatus 2 or the inspection apparatus 3 shown in FIG. 1 via the network 4.

The printing original image creator 102, which is an example of a seventh image data creator, creates "printing original image data" supported by the image forming unit 10 on the basis of original image data input from the setting apparatus 2 via the transmitter/receiver 101. When creating printing original image data from original image data, the printing original image creator 102 converts the set color space of the original image data into a color space (called an "output color space") corresponding to color materials of the image forming unit 10. In this example, the output color space, which is an example of a first color space, is defined by a CMYK color space corresponding to color materials (in this example, cyan, magenta, yellow, and black) of the image forming unit 10. Additionally, when creating printing original image data from original image data, the printing original image creator 102 sets the resolution (called "output resolution") corresponding to the set resolution of the original image data. Normally, the output resolution is set to be the same value as the set resolution. However, the output resolution may be value different from the set resolution.

The image forming unit 10 prints an image (printed image) on a sheet P on the basis of the output color space and the output resolution by using the printing original image data created by the printing original image creator 102.

The image reader 70 reads a printed image on a sheet P by using the three line sensors. The image reader 70 then creates "read image data" on the basis of results obtained by reading the printed image by using the individual line sensors. When creating read image data from the reading results, the image reader 70 sets the color space of read image data into a color space (called an "input color space") corresponding to reading colors of the individual line sensors. In this example, the input color space, which is an example of a second color space, is defined by the RGB color space corresponding to the colors (in this example, red, green, and blue) of the individual line sensors forming the image reader 70. When creating read image data from the reading results, the image reader 70 sets the resolution (input resolution) on the basis of the reading results. The input resolution is determined by the gap between which plural sensor elements forming each line sensor are arranged, the reading cycle of each line sensor, the transport speed of sheets P, etc. The input resolution may be the same value as the output resolution, or may be a value different from the output resolution.

The checking original image creator 103, which is an example of a first color converter, creates "checking original image data", which is an example of second image data, on the basis of original image data input from the setting apparatus 2 via the transmitter/receiver 101. The checking original image data serves as a reference for inspecting an image for defects, which will be discussed later. When creating checking original image data from original image data, the checking original image creator 103 converts the set color space of the original image data into a color space (called an "inspection color space") used for inspecting an image for defects. The inspection color space, which is an example of a third color space, is defined by the CIELAB (hereinafter may be referred to as "L*a*b*") color space. When creating checking original image data from original image data, the checking original image creator 103 also converts the set resolution into a resolution (called an "inspection resolution") used for inspecting an image for defects. The inspection resolution is determined on the basis of the relationship between the output resolution of the image forming unit 10 and the input resolution of the image reader 70. If the output resolution is the same value as that of the input resolution, the inspection resolution may be set to be the output resolution or the input resolution. If the output resolution is a value different from that of the input resolution, a lower resolution (e.g., the input resolution) between the two resolutions is determined and the other resolution (e.g., the output resolution) is adjusted to the lower resolution. Alternatively, both of the output resolution and the input resolution may be converted to an even lower resolution.

The color gamut inside/outside determining section 104, which is an example of a determining unit, stores therein, as a look-up table (LUT), color gamut data in which a color gamut which can be printed by the image forming unit 10 is associated with a color gamut which can be read by the image reader 70.

Figure 5:
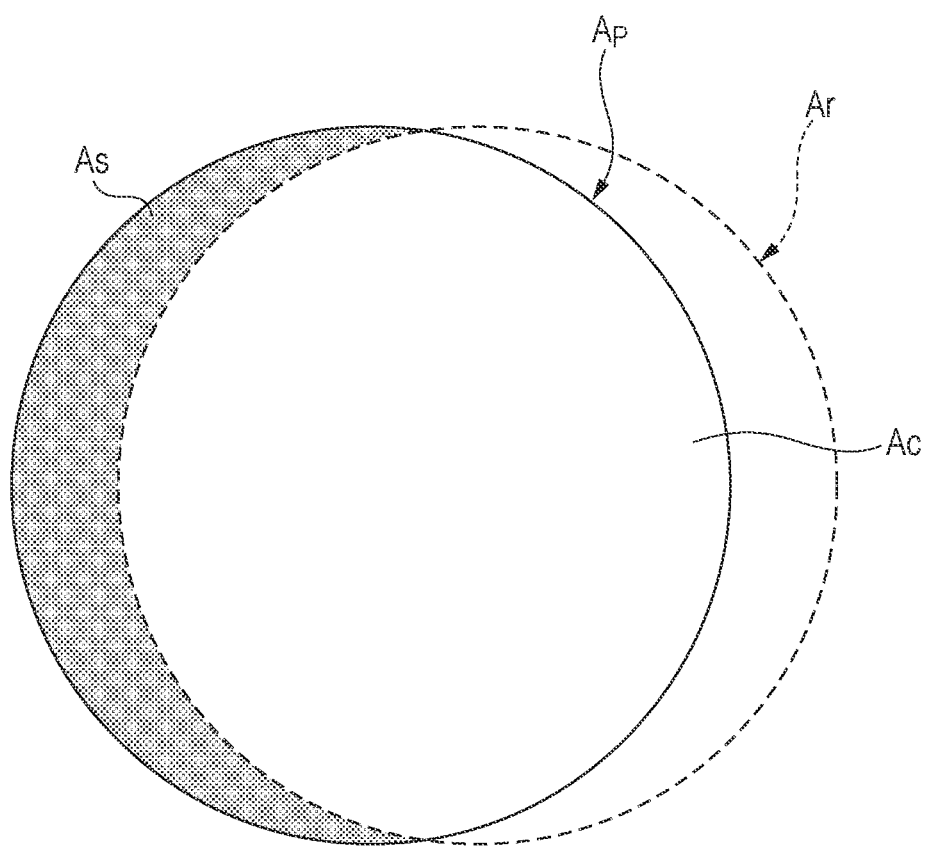
FIG. 5 schematically illustrates the structure of color gamut data.

FIG. 5 schematically illustrates the structure of the color gamut data stored in the color gamut inside/outside determining section 104. The color gamut data includes an output color gamut Ap, which is a color gamut that can be printed by the image forming unit 10, and an input color gamut Ar, which can be read by the image reader 70. An overlapping portion of the output color gamut Ap and the input color gamut Ar is a common color gamut Ac in which a color printed by the image forming unit 10 can be read by the image reader 70 as the same color. The output color gamut Ap includes a printing specific color gamut As in which a color printed by the image forming unit 10 is not read by the image reader 70 as the same color. In this example, since the inspection color space of the checking original image data input into the color gamut inside/outside determining section 104 is defined in the CIELAB color space, the color gamut data is also defined in the CIELAB color space. Accordingly, the actual color gamut data has a three-dimensional structure.

Then, the color gamut inside/outside determining section 104 determines by referring to the color gamut data (see FIG. 5) whether the color (pixel value) of each of the pixels of the image represented by the checking original image data created by the checking original image creator 103 is positioned inside or outside the common color gamut Ac. In this case, if the color of a pixel is positioned outside the common color gamut Ac, it also means that the color is positioned inside the printing specific color gamut range As.

The checking read image creator 105, which is an example of a second color converter, creates "checking read image data", which is an example of fourth image data, on the basis of read image data, which is an example of third image data, input from the image reader 70. The checking read image data serves as a reference for inspecting an image for defects. When creating checking read image data from read image data, the checking read image creator 105 converts the input color space of the read image data into the above-described inspection color space. Additionally, when creating checking read image data from read image data, the checking read image creator 105 also converts the input resolution into the above-described inspection resolution if necessary.

The color information substitute section 106, which is an example of a correction unit, extracts, among the pixels of an image represented by the checking original image data input from the checking original image creator 103 via the color gamut inside/outside determining section 104 and the pixels of an image represented by the checking read image data input from the checking read image creator 105, a pixel which is determined to be positioned outside the common color gamut Ac (in other words, a pixel positioned inside the printing specific color gamut As) in the checking original image data and a pixel which is determined to be positioned outside the common color gamut Ac in the checking read image data. The color information substitute section 106 then sets the pixel values of such pixels (hereinafter referred to as "color-gamut outside pixels") to be equal to each other. In the following description, data obtained as a result of performing the above-described substitute processing on the checking original image data by using the color information substitute section 106 will be referred to as "corrected original image data", and data obtained as a result of performing the above-described substitute processing on the checking read image data by using the color information substitute section 106 will be referred to as "corrected read image data". The corrected original image data and the corrected read image data are an example of fifth image data and an example of sixth image data, respectively. In the first exemplary embodiment, the corrected original image data and the corrected read image data are sent to the inspection apparatus 3 via the transmitter/receiver 101.

Figure 6:
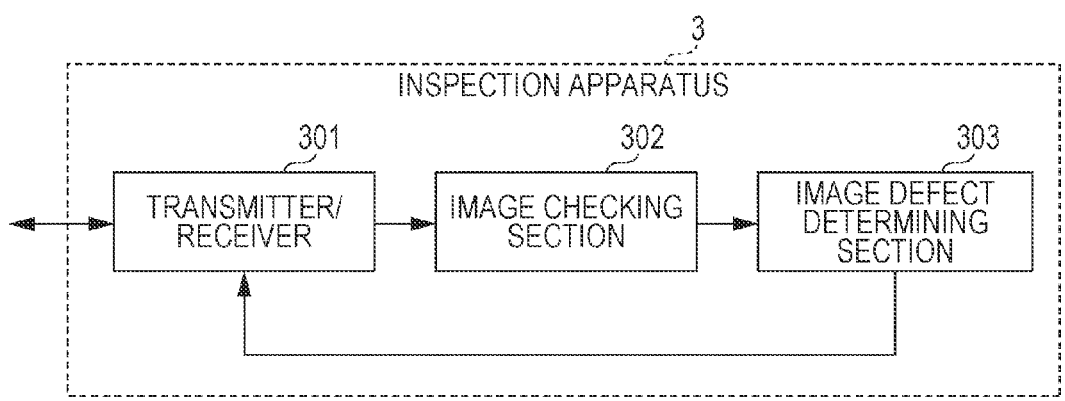
FIG. 6 is a block diagram illustrating the functional configuration of an inspection apparatus.

FIG. 6 is a block diagram illustrating the functional configuration of the inspection apparatus 3 shown in FIG. 1. The inspection apparatus 3 is constituted by a computer including a CPU, a ROM, a RAM, etc. The inspection apparatus 3 performs inspection to find defects of an image printed on a sheet P by using the printing apparatus 1.

The inspection apparatus 3, which is an example of an inspection unit, includes a transmitter/receiver 301, an image checking section 302, and an image defect determining section 303.

The transmitter/receiver 301 transmits and receives various items of data to and from the printing apparatus 1 or the setting apparatus 2 shown in FIG. 1 via the network 4.

The image checking section 302 checks the pixel value of each of pixels of the image represented by corrected original image data against the pixel value of the associated pixel the image represented by corrected read image data, both items of data being obtained from the same original image data and input from the printing apparatus 1 via the transmitter/receiver 301.

The image defect determining section 303 checks for, on the basis of the checking results obtained from the image checking section 302, defects of an image printed on a sheet P. The determination results obtained from the image defect determining section 303 are sent to the setting apparatus 2 via the transmitter/receiver 301.

Figure 7:
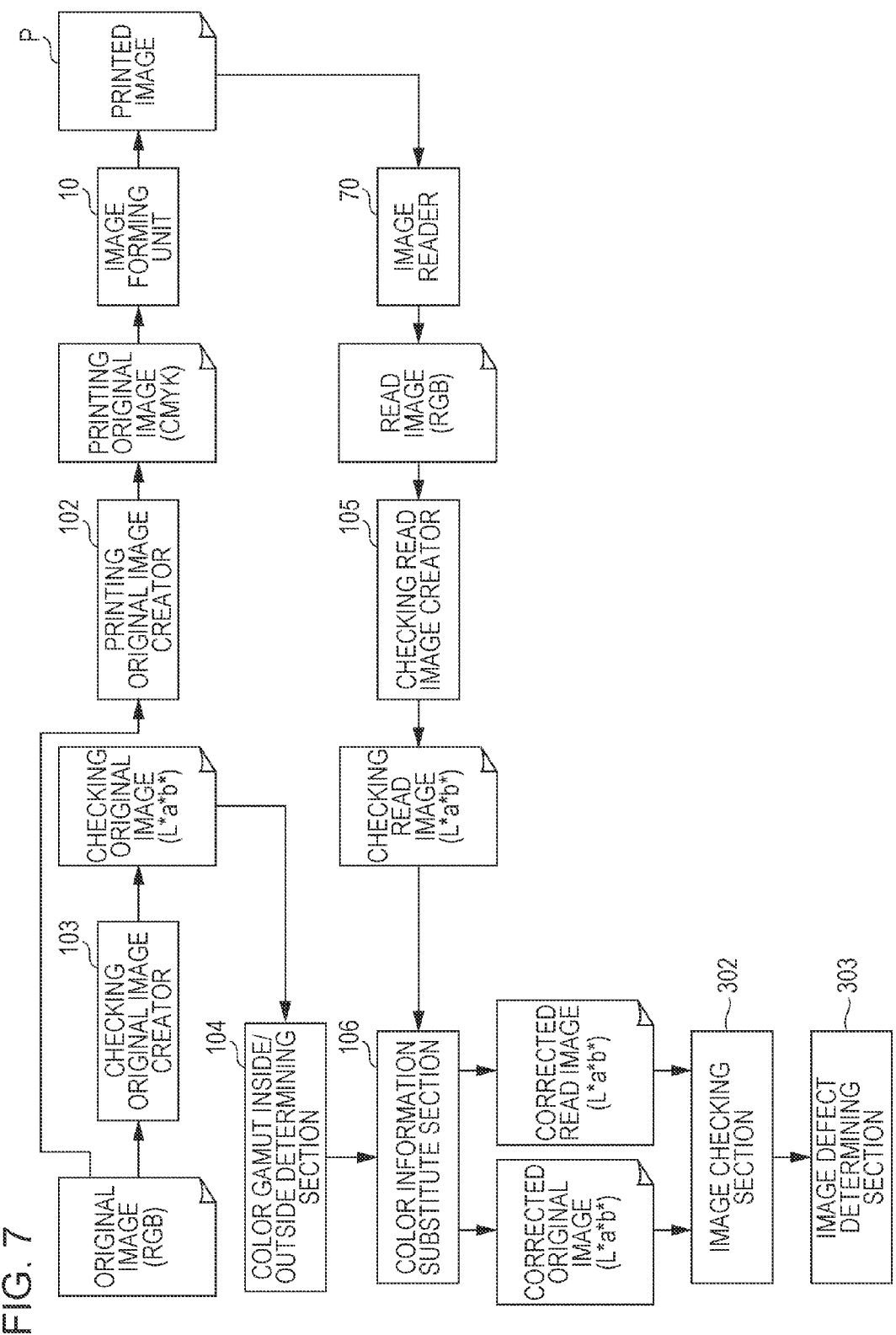
FIG. 7 illustrates a printing/inspecting procedure in a printing system of the first exemplary embodiment.

FIG. 7 illustrates a printing/inspecting procedure in the printing system of the first exemplary embodiment. A description will be given, with reference to FIG. 7, of operations performed by the printing apparatus 1, the setting apparatus 2, and the inspection apparatus 3 of the printing system and data sent and received among these apparatuses.

In this example, it is assumed that the set resolution is 300 dots per inch (dpi), the output resolution is 600 dpi, the input resolution is 300 dpi, and the inspection resolution is 300 dpi.

Original image data (having a set color space (in this example, RGB) and a set resolution) created in the setting apparatus 2 (not shown) is input into the printing original image creator 102 of the printing apparatus 1. The printing original image creator 102 then creates printing original image data (having an output color space (in this example, CMYK) and an output resolution) on the basis of the received original image data. The same original image data (having a set RGB color space and a set resolution) is also input into the checking original image creator 103 of the printing apparatus 1. The checking original image creator 103 then creates checking original image data (having an inspection color space (in this example, L*a*b*) and an inspection resolution) on the basis of the received original image data.

In the printing apparatus 1, the printing original image data (having a CMYK color space and an output resolution) created by the printing original image creator 102 is input into the image forming unit 10. The image forming unit 10 then prints an image including CMYK colors on a sheet P. Subsequently, the image reader 70 provided in the printing apparatus 1 reads the image printed on the sheet P. The image reader 70 then creates read image data (having an input color space (in this example, RGB) and an input resolution) on the basis of results obtained by reading the image by using three line sensors.

In the printing apparatus 1, the read image data created by the image reader 70 is input into the checking read image creator 105. The checking read image creator 105 then creates checking read image data (having an L*a*b* color space and an inspection resolution) on the basis of the read image data (having an RGB color space and an input resolution).

Meanwhile, in the printing apparatus 1, the checking original image data (having an L*a*b* color space and an inspection resolution) created by the checking original image creator 103 is input into the color gamut inside/outside determining section 104. The color gamut inside/outside determining section 104 then determines, by referring to the above-described color gamut data, whether the color (pixel value) of each of the pixels of the image represented by the checking original image data is contained within the common color gamut Ac (see FIG. 5).

In the printing apparatus 1, the checking original image data (having an L*a*b* color space and an inspection resolution) and the checking read image data (having an L*a*b* color space and an inspection resolution), which have been obtained from the same original image data (having an RGB color space and a set resolution), are input into the color information substitute section 106. Determination results concerning the color gamut of the checking original image data obtained from the color gamut inside/outside determining section 104 are also input into the color information substitute section 106. The color information substitute section 106 sets, among the pixels of the image represented by the checking original image data and the pixels of the image represented by the checking read image data, the pixel values of pixels that are determined to be positioned outside the common color gamut Ac (inside the printing specific color gamut As) to be equal to each other, and outputs results as corrected original image data (having an L*a*b* color space and an inspection resolution) and corrected read image data (having an L*a*b* color space and an inspection resolution). A specific procedure of processing performed by the color information substitute section 106 will be discussed later.

Subsequently, in the inspection apparatus 3, the corrected original image data and the corrected read image data output from the color information substitute section 106 of the printing apparatus 1 are input into the image checking section 302. The image checking section 302 then checks the pixel value of each of the pixels of the imager represented by the corrected original image data against the pixel value of the associated pixel of the image represented by the corrected read image data. The image checking section 302 may check the pixel values in the following manner. The difference between the pixel value of each of the pixels of the image represented by the corrected original image data and the pixel value of the associated pixel of the image represented by the corrected read image data, the two pixels being located at the same position in two-dimensional coordinates, is calculated.

In the inspection apparatus 3, the checking results obtained from the image checking section 302 are input into the image defect determining section 303. The image defect determining section 303 then checks for image defects in the image printed on a sheet P on the basis of the original image data associated with the checking results. The image defect determining section 303 may check for image defects in the following manner. If the above-described difference in the checking results is greater than a predetermined reference value, the image defect determining section 303 determines that there is an image defect. If it is determined that there is an image defect, the determination results are sent to the setting apparatus 2. In the setting apparatus 2, an image indicating the occurrence of image defects is displayed on the UI 202 (see FIG. 3).

FIGS. 8A and 8B illustrate the content of processing performed by the color information substitute section 106 of the first exemplary embodiment. FIG. 8A illustrates the relationship between checking original image data input into the color information substitute section 106 and corrected original image data output from the color information substitute section 106. FIG. 8B illustrates the relationship between checking read image data input into the color information substitute section 106 and corrected read image data output from the color information substitute section 106. As stated above, individual items of the above-described image data shown in FIGS. 8A and 8B are each constituted by plural pixels having the inspection resolution, and the pixel values of the pixels are defined in the inspection color space, i.e., the CIELAB color space. Accordingly, individual items of the above-described image data each include a table of the pixel values of the "L*" component, a table of the pixel values of the "a*" component, and a table of the pixel values of the "b*" component.

In this example, it is assumed that, in the checking original image data shown in FIG. 8A, the pixel on the fourth row from the top and the third column from the left is determined to be a color-gamut outside pixel by the color gamut inside/outside determining section 104. Also it is assumed that, in the checking original image data shown in FIG. 8A, the pixel value of the color-gamut outside pixel is (x, y, z), and that, in the checking read image data shown in FIG. 8B, the pixel value of a color-gamut outside pixel is (u, v, w). The pixel value (x, y, z) exists outside the common color gamut Ac (inside the printing specific color gamut As) of the color gamut data shown in FIG. 5, and the pixel value (u, v, w) exists inside the common color gamut Ac of the color gamut shown in FIG. 5.

The color information substitute section 106 overwrites the pixel value (u, v, w) of the color-gamut outside pixel in the checking read image data with the associated pixel value (x, y, z) of the color-gamut outside pixel in the checking original image data, thereby setting the pixel value of the color-gamut outside pixel in the checking read image data and that in the checking original image data located at the same position (same coordinates) to be equal to each other. The reason for setting the pixel value of the color-gamut outside pixel in the checking read image data to that in the checking original image data is because the checking original image data has been created before the checking read image data which is created after reading the image printed on a sheet P. However, the pixel value (x, y, z) of the color-gamut outside pixel in the checking original image data may be overwritten with the pixel value (u, v, w) of the color-gamut outside pixel in the checking read image data.

Thus, in each of the corrected original image data and the corrected read image data output from the color information substitute section 106, a pixel determined to be a color-gamut outside pixel has the pixel value (x, y, z).

In the printing system of the first exemplary embodiment, as discussed with reference to FIG. 5, there is a disparity between the output color gamut Ap that can be printed by the image forming unit 10 and the input color gamut Ar that can be read by the image reader 70. Accordingly, if an image including a color existing within the printing specific color gamut As is printed on a sheet P by the image forming unit 10 and if the printed image is read by the image reader 70, the color of the printed image may be replaced by a color within the common color gamut Ac. Thus, when checking image data representing the image which has not been printed (e.g., checking original image data) against image data indicating the image which has been printed and read by the image reader 70 (e.g., checking read image data) in the inspection apparatus 3, the difference (color difference) between the pixel value of a pixel having a color within the printing specific color gamut As of the image which has not been printed and the pixel value of the associated pixel having a color replaced by a color within the common color gamut Ac may become large even if the color within the printing specific color gamut As in the printed image on a sheet P is an intended color. As a result, this pixel may be wrongly interpreted as an image defect.

In contrast, in the printing apparatus 1 of the first exemplary embodiment, the pixel value of a pixel (color-gamut outside pixel) having a color contained in the printing specific color gamut As in the checking original image data and the pixel value of the associated pixel in the checking read image data are set to be equal to each other. Then, corrected original image data obtained as a result of correcting the checking original image data and corrected read image data obtained as a result of correcting the checking read image data are output from the printing apparatus 1 to the inspection apparatus 3. Accordingly, the inspection apparatus 3 determines the difference (color difference) between the pixel value of a color-gamut outside pixel in the corrected original image data and the pixel value of the associated pixel in the corrected read image data to be 0 (no color difference), thereby preventing this pixel from being wrongly interpreted as an image defect. It is thus possible to reduce the possibility of misinterpretation concerning image defects, which may be caused by the difference between the output color gamut Ap of the image forming unit 10 and the input color gamut Ar of the image reader 70.

Second Exemplary Embodiment

In the first exemplary embodiment, the pixel value of a pixel which is determined to be a color-gamut outside pixel in checking original image data and that in checking read image data are set to be equal to each other, thereby creating corrected original image data and corrected read image data, respectively. In contrast, in a second exemplary embodiment, both of a pixel which is determined to be a color-gamut outside pixel in checking original image data and a pixel which is determined to be a color-gamut outside pixel in checking read image data are excluded from pixels to be subjected to an inspection operation, thereby creating corrected original image data and corrected read image data. In the second exemplary embodiment, elements similar to those of the first exemplary embodiment are designated by like reference numerals, and a detailed explanation thereof will thus be omitted.

Figure 9:
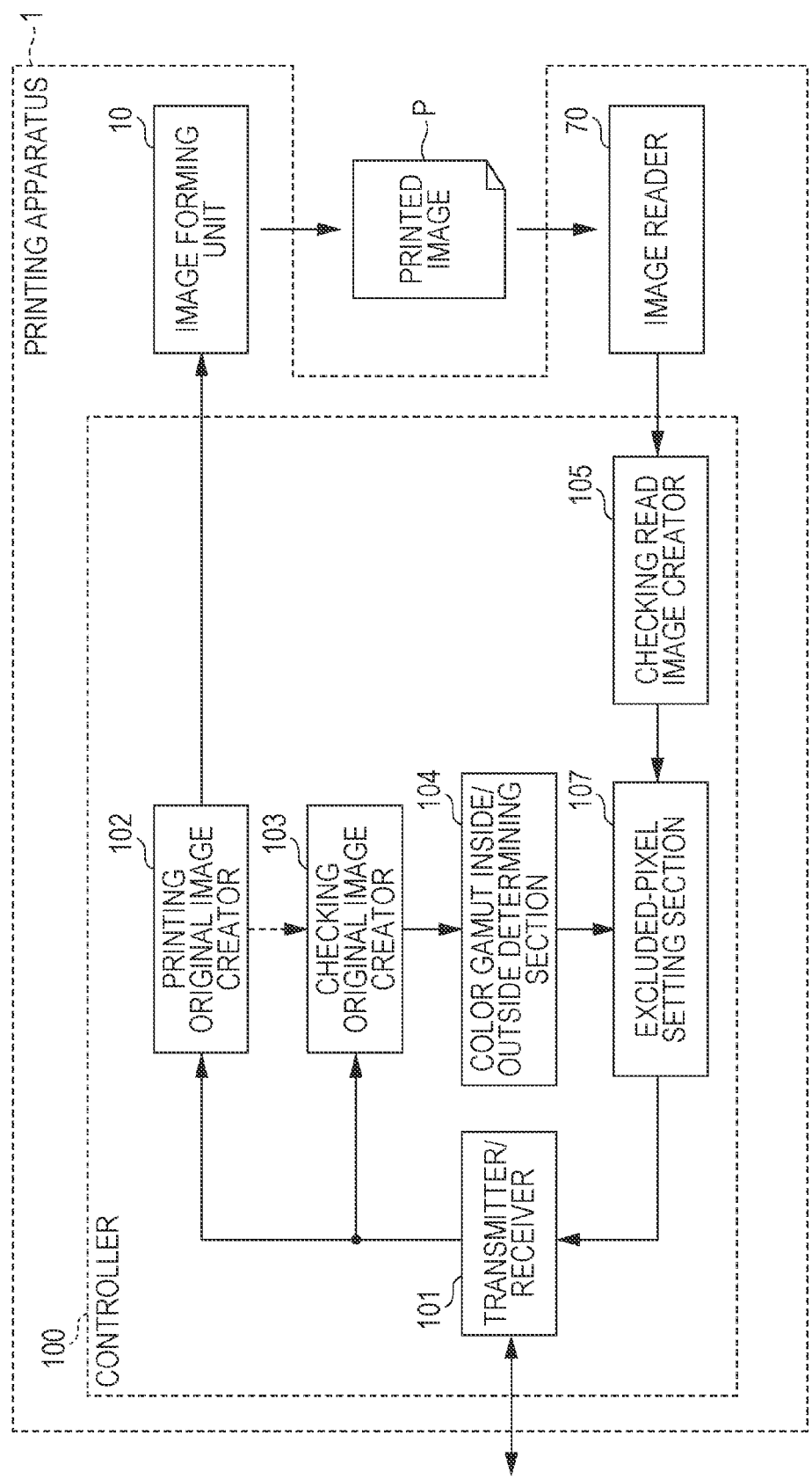
FIG. 9 is a block diagram illustrating the functional configuration of a printing apparatus according to a second exemplary embodiment.

FIG. 9 is a block diagram illustrating the functional configuration of the printing apparatus 1 of the second exemplary embodiment.

The printing apparatus 1 of the second exemplary embodiment includes the image forming unit 10 that forms an image on a sheet P, the image reader 70 that reads an image printed on a sheet P, and the controller 100 that controls the image forming unit 10 and the image reader 70. The controller 100 includes the transmitter/receiver 101, the printing original image creator 102, the checking original image creator 103, the color gamut inside/outside determining section 104, the checking read image creator 105, and an excluded-pixel setting section 107. That is, the second exemplary embodiment differs from the first exemplary embodiment in that the controller 100 includes the excluded-pixel setting section 107 instead of the color information substitute section 106.

The excluded-pixel setting section 107 sets, among pixels of an image represented by checking original image data received from the checking original image creator 103 via the color gamut inside/outside determining section 104 and pixels of an image represented by checking read image data received from the checking read image creator 105, pixels which are determined to be color-gamut outside pixels by the color gamut inside/outside determining section 104 as pixels to be excluded from pixels to be subjected to an inspection operation performed by the inspection apparatus 3. Corrected original image data obtained as a result of correcting the checking original image data in the above-described manner and corrected read image data obtained as a result of correcting the checking read image data in the above-described manner are output from the excluded-pixel setting section 107. Then, the corrected original image data and the corrected read image data are sent to the inspection apparatus 3 via the transmitter/receiver 101, as in the first exemplary embodiment.

FIGS. 10A and 10B illustrate the content of processing performed by the excluded-pixel setting section 107 of the second exemplary embodiment. FIG. 10A illustrates the relationship between checking original image data input into the excluded-pixel setting section 107 and corrected original image data output from the excluded-pixel setting section 107. FIG. 10B illustrates the relationship between checking read image data input into the excluded-pixel setting section 107 and corrected read image data output from the excluded-pixel setting section 107. As in the first exemplary embodiment, individual items of the above-described image data each include a table of the pixel values of the "L*" component, a table of the pixel values of the "a*" component, and a table of the pixel values of the "b*" component.

In this example, too, it is assumed that, in the checking original image data shown in FIG. 10A, the pixel on the fourth row from the top and the third column from the left is determined to be a color-gamut outside pixel by the color gamut inside/outside determining section 104. Also it is assumed that, in the checking original image data shown in FIG. 10A, the pixel value of the color-gamut outside pixel is (x, y, z), and that, in the checking read image data shown in FIG. 10B, the pixel value of a color-gamut outside pixel is (u, v, w). The pixel value (x, y, z) exists outside the common color gamut Ac (inside the printing specific color gamut As) of the color gamut data shown in FIG. 5, and the pixel value (u, v, w) exists inside the common color gamut Ac of the color gamut shown in FIG. 5.

In the second exemplary embodiment, the excluded-pixel setting section 107 masks the pixel value (x, y, z) of the color-gamut outside pixel in the checking original image data and the pixel value (u, v, w) of the color-gamut outside pixel in the checking read image data. This means that the masked pixels are pixels to be excluded from pixels to be subjected to an inspection operation.

Accordingly, in the corrected original image data and the corrected read image data output from the excluded-pixel setting section 107, pixels that are determined to be color-gamut outside pixels are treated as non-existing pixels.

In the printing apparatus 1 of the second exemplary embodiment, both in checking original image data and checking read image data, pixels having a color that exists in the printing specific color gamut As (color-gamut outside pixels) are excluded from pixels to be subjected to an inspection operation. Then, corrected original image data obtained as a result of correcting the checking original image data in the above-described manner and corrected read image data obtained as a result of correcting the checking read image data in the above-described manner are output from the printing apparatus 1 to the inspection apparatus 3. Accordingly, in the inspection apparatus 3, the difference between the pixel value of a color-gamut outside pixel in the checking original image data and that of the associated pixel in the checking read image data is not calculated, thereby preventing this pixel from being wrongly interpreted as an image defect. Thus, in the second exemplary embodiment, too, it is possible to reduce the possibility of misinterpretation concerning image defects, which may be caused by the difference between the output color gamut Ap of the image forming unit 10 and the input color gamut Ar of the image reader 70.

Third Exemplary Embodiment

In the first and second exemplary embodiments, in the inspection apparatus 3, two items of image data (corrected original image data and corrected read image data) obtained before and after performing a printing operation are checked against each other, thereby inspecting an image for defects. In contrast, in a third exemplary embodiment, in the inspection apparatus 3, image defects are checked for on the basis of difference image data indicating the difference between two items of image data obtained before and after a printing operation. In the third exemplary embodiment, therefore, instead of creating two items of image data in the printing apparatus 1, difference image data indicating the difference between the two items of image data is created. In the third exemplary embodiment, elements similar to those of the first exemplary embodiment are designated by like reference numerals, and a detailed explanation thereof will thus be omitted.

Figure 11:
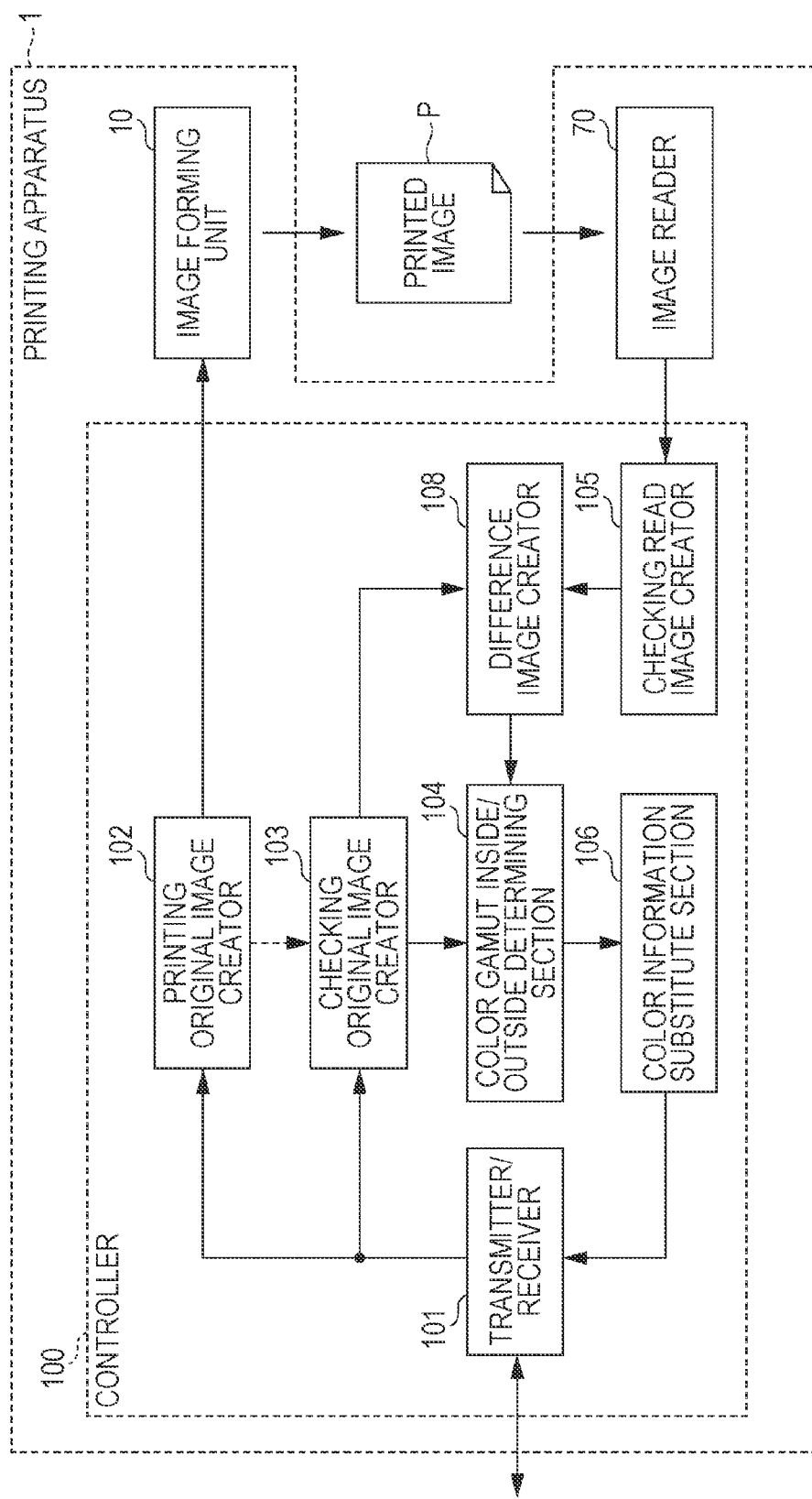
FIG. 11 is a block diagram illustrating the functional configuration of a printing apparatus according to a third exemplary embodiment.

FIG. 11 is a block diagram illustrating the functional configuration of the printing apparatus 1 of the third exemplary embodiment.

The printing apparatus 1 of the third exemplary embodiment includes the image forming unit 10 that forms an image on a sheet P, the image reader 70 that reads an image printed on a sheet P, and the controller 100 that controls the image forming unit 10 and the image reader 70. The controller 100 includes the transmitter/receiver 101, the printing original image creator 102, the checking original image creator 103, the color gamut inside/outside determining section 104, the checking read image creator 105, the color information substitute section 106, and a difference image creator 108. That is, the third exemplary embodiment differs from the first exemplary embodiment in that the controller 100 includes the difference image creator 108 and in that the content of processing performed by the color gamut inside/outside determining section 104 and that performed by the color information substitute section 106 are different from those of the first exemplary embodiment.

By using checking original image data created by the checking original image creator 103 and checking read image data created by the checking read image creator 105, which have been created on the basis of the same original image data, the difference image creator 108, which is an example of an eighth image data creator, calculates the difference between the pixel value of each of pixels represented by the checking original image data and the pixel value of the associated pixel represented by the checking read image data, thereby creating difference image data. In this example, the checking original image data and the checking read image data have been defined in the inspection color space and have been created with the inspection resolution. Accordingly, difference image data is also defined in the inspection color space and is created with the inspection resolution.

The color gamut inside/outside determining section 104 of the third exemplary embodiment receives the difference image data from the difference image creator 108, and then extracts, as a "pixel of interest", a pixel having a large color difference (difference in the pixel value between the checking original image data and the checking read image data). Then, the color gamut inside/outside determining section 104 determines, by referring to the color gamut data (see FIG. 5), whether the color (pixel value) of the pixel, among the pixels indicated by the checking original image data, located at the same position (same coordinates) as the pixel of interest is positioned inside or outside the common color gamut Ac (inside the printing specific color gamut As).

The color information substitute section 106 of the third exemplary embodiment replaces (overwrites) the pixel value of a pixel which is determined to be a color-gamut outside pixel by the color gamut inside/outside determining section 104 with zero (no color difference). In the following description, image data subjected to this substitute processing and output from the color information substitute section 106 will be referred to as "corrected difference image data", which is an example of ninth image data. In the third exemplary embodiment, the corrected difference image data is sent to the inspection apparatus 3 via the transmitter/receiver 101.

Figure 12:
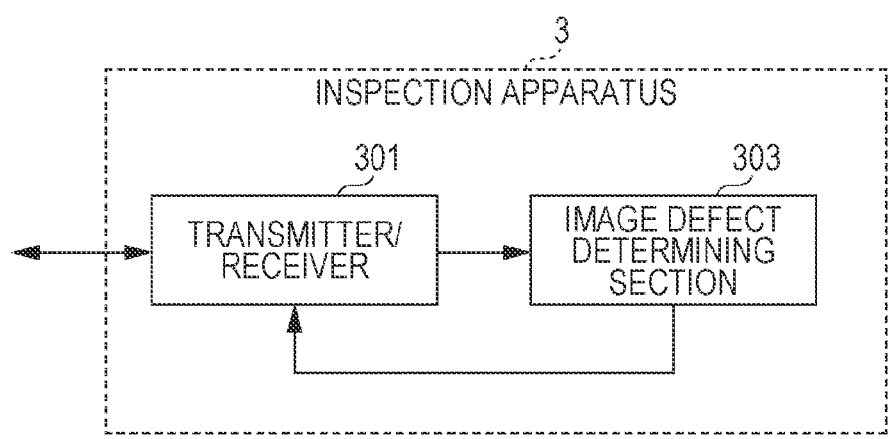
FIG. 12 is a block diagram illustrating the functional configuration of an inspection apparatus according to the third exemplary embodiment.

FIG. 12 is a block diagram illustrating the functional configuration of the inspection apparatus 3 of the third exemplary embodiment.

The inspection apparatus 3 includes the transmitter/receiver 301 and the image defect determining section 303 but does not include the image checking section 302.

The image defect determining section 303 of the third exemplary embodiment checks for defects in an image printed on a sheet P on the basis of the corrected difference image data received from the printing apparatus 1 via the transmitter/receiver 301. Determination results obtained from the image defect determining section 303 are sent to the setting apparatus 2 via the transmitter/receiver 301.

Figure 13:
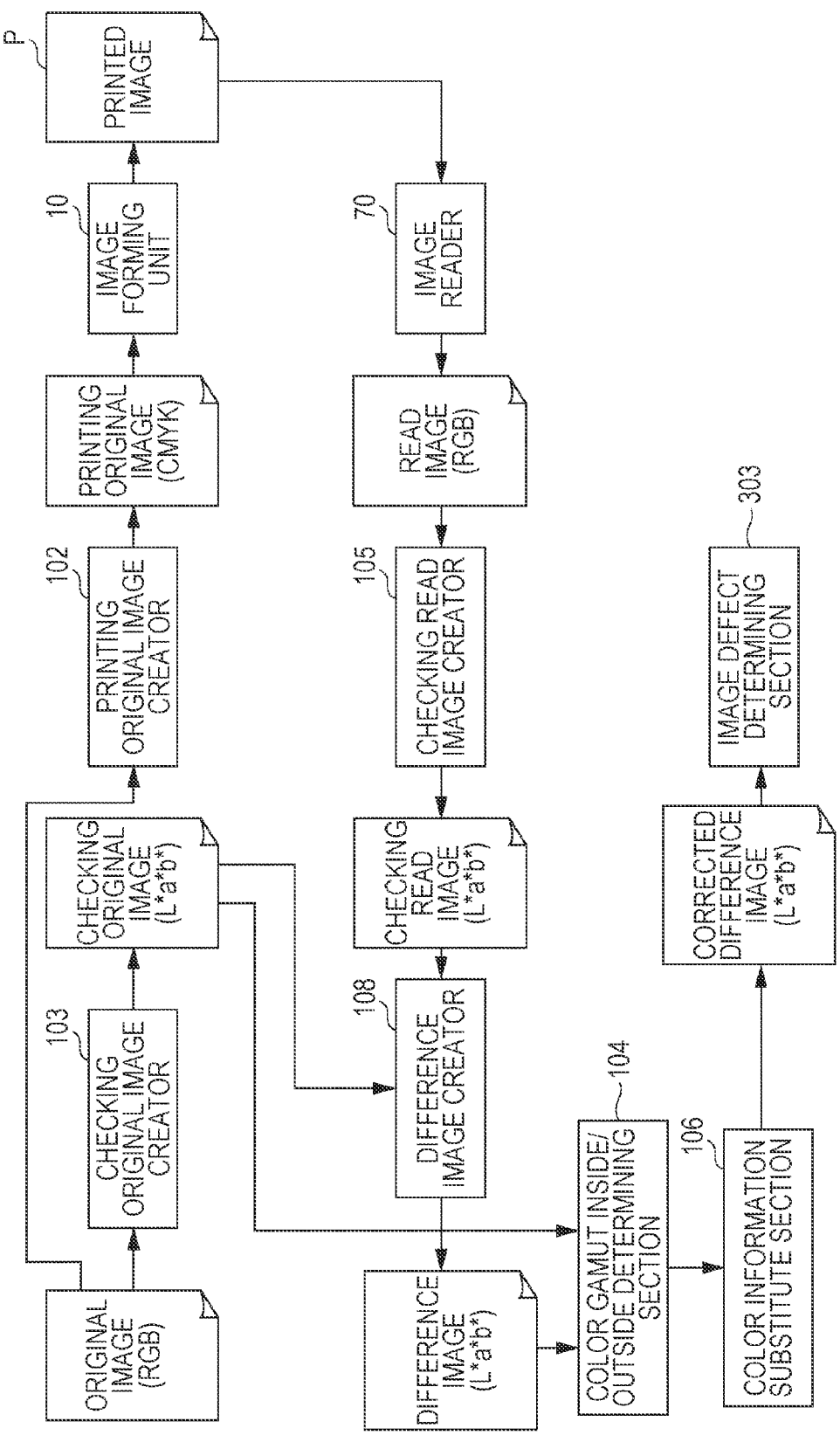
FIG. 13 illustrates a printing/inspecting procedure in a printing system of the third exemplary embodiment.

FIG. 13 illustrates a printing/inspecting procedure in the printing system of the third exemplary embodiment. A description will be given below, with reference to FIG. 13, of operations performed by the printing apparatus 1, the setting apparatus 2, and the inspection apparatus 3 of the printing system and data sent and received among these apparatuses.

Original image data (having a set color space (in this example, RGB) and a set resolution) created in the setting apparatus 2 (not shown) is input into the printing original image creator 102 of the printing apparatus 1. The printing original image creator 102 then creates printing original image data (having an output color space (in this example, CMYK) and an output resolution) on the basis of the received original image data. The same original image data (having a set RGB color space and a set resolution) is also input into the checking original image creator 103 of the printing apparatus 1. The checking original image creator 103 then creates checking original image data (having an inspection color space (in this example, L*a*b*) and an inspection resolution) on the basis of the received original image data.

In the printing apparatus 1, the printing original image data (having a CMYK color space and an output resolution) created by the printing original image creator 102 is input into the image forming unit 10. The image forming unit 10 then prints an image including CMYK colors on a sheet P. Subsequently, the image reader 70 provided in the printing apparatus 1 reads the image printed on the sheet P. The image reader 70 then creates read image data (having an input color space (in this example, RGB) and an input resolution) on the basis of results obtained by reading the image by using three line sensors.

In the printing apparatus 1, the read image data created by the image reader 70 is input into the checking read image creator 105. The checking read image creator 105 then creates checking read image data (having an L*a*b* color space and an inspection resolution) on the basis of the read image data (having an RGB color space and an input resolution).

In the printing apparatus 1, the checking original image data (having an L*a*b* color space and an inspection resolution) created by the checking original image creator 103 and the checking read image data (having an L*a*b* color space and an inspection resolution) created by the checking read image creator 105 are input into the difference image creator 108. By utilizing the checking original image data and the checking read image data, which have been generated on the basis of the same original image data, the difference image creator 108 calculates the difference between the pixel value of each of pixels represented by the checking original image data and the pixel value of the associated pixel represented by the checking read image data, and creates difference image data (having an L*a*b* color space and an inspection resolution). In the difference image data, the calculated differences are used as the pixel values of the individual pixels of the difference image data. A specific procedure of processing performed by the difference image creator 108 will be discussed later.

Subsequently, in the printing apparatus 1, the checking original image data (having an L*a*b* color space and an inspection resolution) and the difference image data (having an L*a*b* color space and an inspection resolution), which are obtained on the basis of the same original image data, are input into the color gamut inside/outside determining section 104. The color gamut inside/outside determining section 104 then extracts a pixel of interest from the difference image data and determines, by referring to the color gamut data (see FIG. 5), whether the color (pixel value) of the pixel, among the pixels of an image represented by the checking original image data, located at the same position (coordinates) as the pixel of interest is inside or outside the common color gamut Ac (inside the printing specific color gamut Ac). Then, the color gamut inside/outside determining section 104 sets, among the extracted pixels of interest in the difference image data, the pixel located at the same position (coordinates) as a pixel having a pixel value which is determined to be positioned outside the common color gamut Ac as a color-gamut outside pixel.

In the printing apparatus 1, the difference image data (having an L*a*b* color space and an inspection resolution), which has been obtained from the same original image data (having an RGB color space and a set resolution), and the determination results concerning color-gamut outside pixels, are input into the color information substitute section 106. The color information substitute section 106 then replaces (overwrites), among the pixels of an image represented by the difference image data, the pixel value of pixels which have been determined to be color-gamut outside pixels in the determination results with zero, and outputs results as corrected difference image data (having an L*a*b* color space and an inspection resolution). A specific procedure of processing performed by the color information substitute section 106 will be discussed later.

Subsequently, in the inspection apparatus 3, the corrected difference image data output from the color information substitute section 106 of the printing apparatus 1 is input into the image defect determining section 303. The image defect determining section 303 then checks for image defects in the image printed on a sheet P on the basis of the corrected difference image data. The image defect determining section 303 may check for image defects in the following manner. If the pixel value of a pixel indicated by the corrected difference image data, i.e., the color difference, is greater than a predetermined reference value, the image defect determining section 303 determines that there is an image defect. If it is determined that there is an image defect, the determination results are sent to the setting apparatus 2. In the setting apparatus 2, an image indicating the occurrence of image defects is displayed on the UI 202 (see FIG. 3).

Figure 14A:
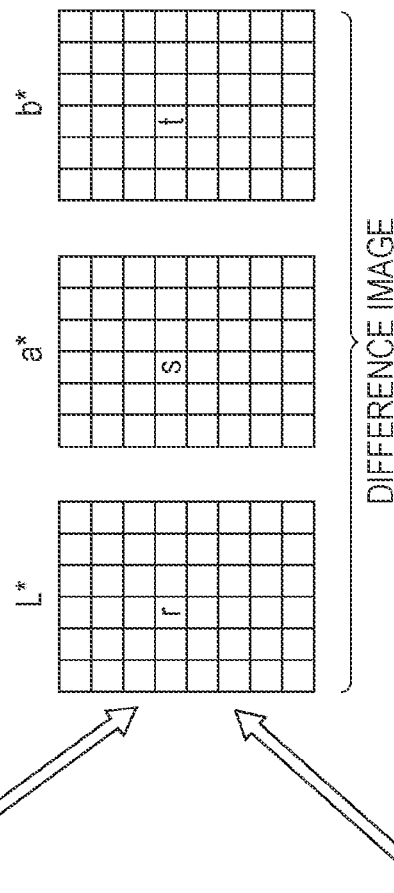
FIGS. 14A through 14C illustrate the content of processing performed by a difference image creator according to the third exemplary embodiment.
Figure 14B:
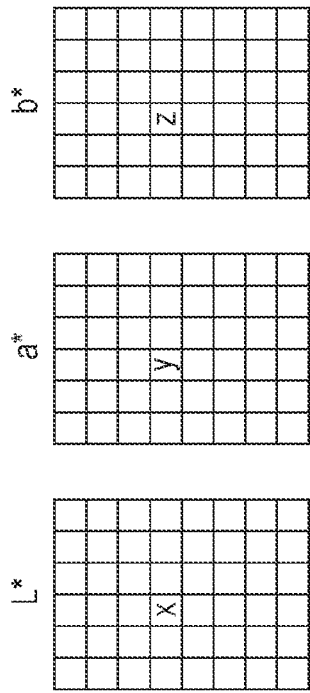
Figure 14C:
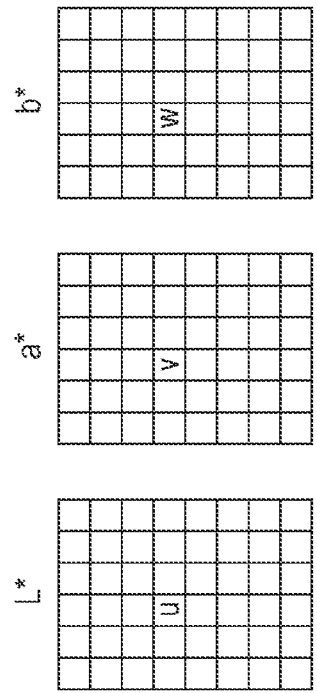

FIGS. 14A through 14C illustrate the content of processing performed by the difference image creator 108. FIG. 14A illustrates checking original image data input into the difference image creator 108. FIG. 14B illustrates checking read image data input into the difference image creator 108. FIG. 14C illustrates difference image data output from the difference image creator 108. As in the first exemplary embodiment, individual items of the above-described image data each include a table of the pixel values of the "L*" component, a table of the pixel values of the "a*" component, and a table of the pixel values of the "b*" component.

In the third exemplary embodiment, a pixel-difference calculating operation is conducted pixel by pixel for all the pixels of the image represented by the checking original image data and the checking read image data. In this example, among the pixels in the checking original image data shown in FIG. 14A, the pixel on the fourth row from the top and the third column from the left in FIG. 14A is taken as an example. In the following description, a pixel subjected to a pixel-difference calculating operation will be referred to as a "subject pixel".

The difference image creator 108 obtains the pixel value (x, y, z) of the subject pixel from the checking original image data and the pixel value (u, w, v) of the subject pixel from the checking read image data and calculates the difference between the pixel values of each of the "L*", "a*", and "b*" components. As a result, the pixel value (r, s, t) of the subject pixel in the difference image data is obtained. In this case, the pixel value (r, s, t) of the subject pixel is represented by, for example, r=u−x, s=v−y, t=w−z. Such a difference calculating operation is performed for all the pixels in the checking original image data and all the pixels in the checking read image data, thereby obtaining difference image data.

FIGS. 15A through 15C illustrate the content of processing performed by the color information substitute section 106. FIG. 15A illustrates difference image data input into the color information substitute section 106. FIG. 15B illustrates determination results (data) concerning color-gamut outside pixels input into the color information substitute section 106. FIG. 15C illustrates corrected difference image data output from the color information substitute section 106.

In this example, it is assumed that the pixel determined to be a set pixel in FIG. 14A (the pixel on the fourth row from the top and the third column from the left in FIG. 14A) has been extracted as a pixel of interest and has been determined to be a color-gamut outside pixel (indicated by x in FIG. 15B) by the color gamut inside/outside determining section 104.

The color information substitute section 106 overwrites the pixel value of the pixel located at the same position (coordinates) in the difference image data as the pixel determined to be a color-gamut outside pixel with a pixel value (0, 0, 0). Accordingly, in corrected difference image data output from the color information substitute section 106, the pixel value of the pixel determined as a color-gamut outside pixel is (0, 0, 0).

In the third exemplary embodiment, in the printing apparatus 1, difference image data is created from checking original image data and checking read image data, and then, in the obtained difference image data, the pixel value of a pixel having a color which exists within the printing specific color gamut As (color-gamut outside pixel) is replaced (overwritten) with 0, thereby correcting the difference image data. Then, the corrected difference image data is output from the printing apparatus 1 to the inspection apparatus 3. Accordingly, in the inspection apparatus 3, the pixel value (color difference) of a color-gamut outside pixel in the difference image data becomes 0 (no color difference), thereby preventing this pixel from being wrongly interpreted as an image defect. It is thus possible to reduce the possibility of misinterpretation concerning image defects, which may be caused by the difference between the output color gamut Ap of the image forming unit 10 and the input color gamut Ar of the image reader 70.

Modified Examples

In the first through third exemplary embodiments, the checking original image creator 103 creates checking original image data on the basis of original image data. Alternatively, the checking original image creator 103 may create checking original image data on the basis of printing original image data created by the printing original image creator 102.

Figure 16:
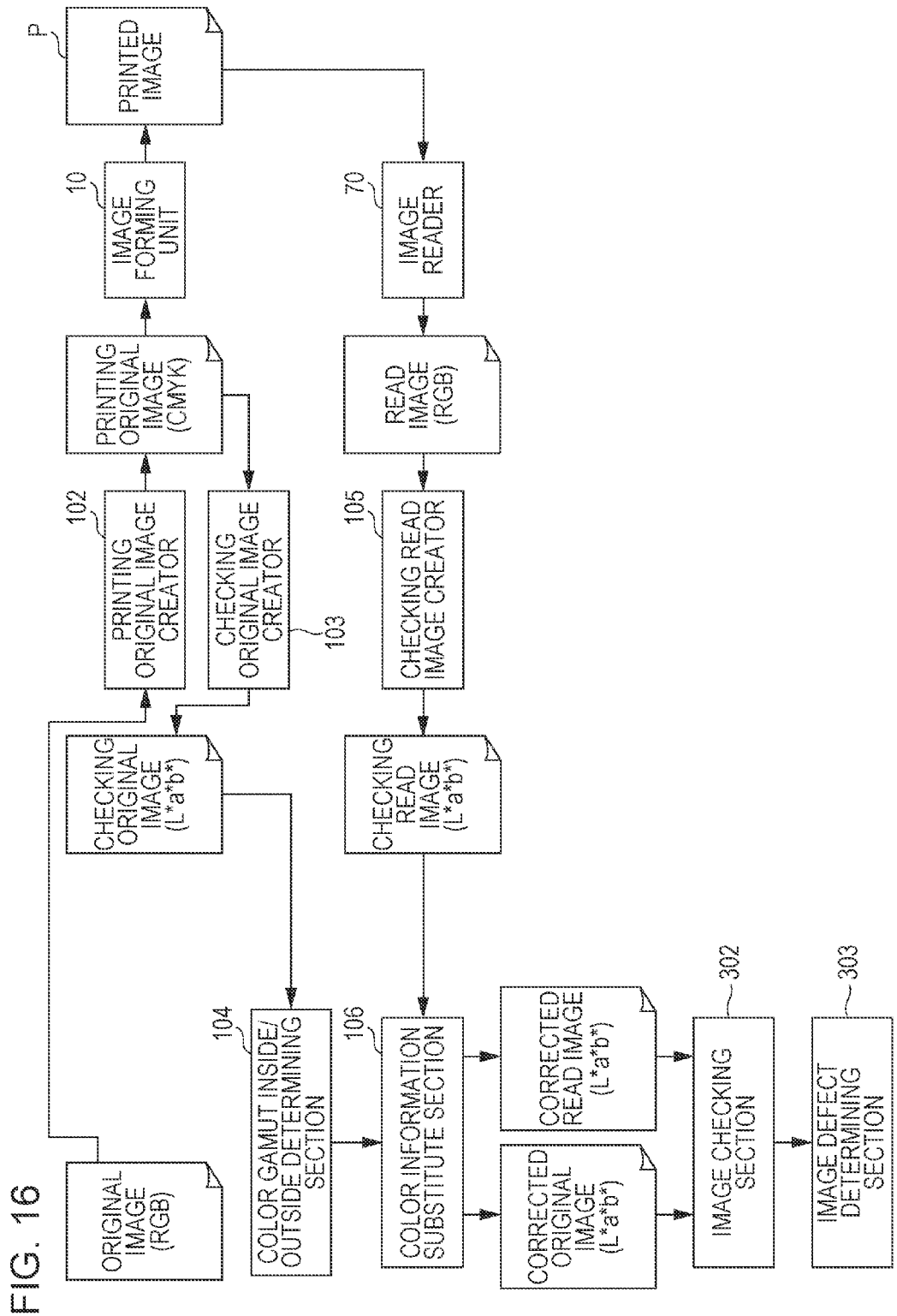
FIG. 16 illustrates a printing/inspecting procedure in a printing system of a modified example of the first exemplary embodiment.

FIG. 16 illustrates a printing/inspecting procedure in a printing system of a modified example of the first exemplary embodiment. FIG. 17 illustrates a printing/inspecting procedure in a printing system of a modified example of the third exemplary embodiment. The modified examples shown in FIGS. 16 and 17 differ from the first and third exemplary embodiments, respectively, in that the checking original image creator 103 creates checking original image data on the basis of printing original image data created by the printing original image creator 102 instead of original image data.

For example, if the color gamut of the set color space in original image data is much wider than that of the output color space in printing original image data created by the printing original image creator 102, it is necessary for the printing original image creator 102 to compress the color gamut from the set color space to the output color space when creating printing original image data. Then, on the basis of the printing original image data having an output color space in which the color gamut has been compressed, the image forming unit 10 forms an image, the image reader 70 reads the formed image, and the checking read image creator 105 creates checking read image data on the basis of read image data obtained as a result of reading the image by using the image reader 70. Thus, the color difference between the checking original image data and the checking read image data obtained in a manner described above becomes smaller than that when checking original image data is created on the basis of original image data in which the color gamut of the color space is not compressed. The second exemplary embodiment may be modified in the same manner.

In the first and second exemplary embodiments, a determination as to whether pixels are color-gamut outside pixels is made on the basis of checking original image data. However, this determination may be made on the basis of original image data or printing original image data.

With this configuration, the above-described determination on the basis of original image data or printing original image data may be made while creating checking original image data on the basis of the original image data or the printing original image data, thereby obtaining determination results more quickly.

In the first through third exemplary embodiments, the set color space of original image data is an RGB color space. Alternatively, it may be another type of color space, such as a CMY color space or a CMYK color space, which is the same as the output color space employed in the first through exemplary embodiments.

In the first through third exemplary embodiments, since CMYK printing (process printing) is performed in the image forming unit 10, the output color space of printing original image data is a CMYK color space. However, if, in order to expand the output color space, CMYKOG printing (hexachrome printing including orange (O) and green (G) in addition to CMYK), CMYKOGV printing (hifi color printing including violet (V) in addition to CMYKOG), or CMYKRGB printing (hifi color printing including RGB in addition to CMYK) is performed in the image forming unit 10, the output color space associated with the type of printing (CMYKOG, CMYKOGV, or CMYKRGB color space) may be utilized.

In the first through third exemplary embodiments, the inspection color space is a CIELAB color space. Alternatively, it may be another type of color space, such as a CIELUV color space.

In the first through third exemplary embodiments, by utilizing direct-to-press electrophotographic-system printing apparatus 1, images are printed on a sheet P. However, an offset printing apparatus (using printing plates) may be utilized as the printing apparatus 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
   an image forming unit that forms an image on a recording medium by using a plurality of color materials corresponding to a first color space;
   an image reader that reads the image formed on the recording medium by the image forming unit in a second color space, which is different from the first color space;
   a first color converter that creates second image data by converting a color space of first image data used for forming the image using the image forming unit into a third color space, a reproduction color gamut of the third color space being wider than a reproduction color gamut of the first color space and a reproduction color gamut of the second color space;
   a second color converter that creates fourth image data by converting a color space of third image data, which is obtained as a result of reading an image by using the image reader, from the second color space to the third color space;
   an eighth image data creator that creates eighth image data by calculating a difference between the second image data and the fourth image data;

a determining unit that detects, among pixels of an image represented by the eighth image data, a pixel having a pixel value which is greater than a predetermined reference value, and determines whether, among the pixels of the image represented by the second image data, the second image data and the eighth image data being obtained on the basis of the first image data, a pixel value of a pixel located at the same position as the pixel having a pixel value which is determined to be greater than the predetermined reference value is located inside or outside an input color gamut that is readable by the image reader;

a correction unit that corrects, among the pixels of the image represented by the eighth image data, a pixel value of a pixel which is determined to be located outside the input color gamut by the determining unit to a predetermined set value; and an inspection unit that refers to each of pixels of an image represented by ninth image data obtained as a result of correcting the eighth image data by using the correction unit, and determines that there is a defect in the image formed on the recording medium by the image forming unit if a pixel value of a pixel in the ninth image data exceeds the predetermined set value.

2. The printing system according to claim 1, further comprising:

a seventh image data creator that creates, on the basis of the first image data, seventh image data, which is used by the image forming unit, in the first color space.

3. The printing system according to claim 2, wherein, after the seventh image data creator creates the seventh image data by converting the color space of the first image data into the first color space, the first color converter creates the second image data by converting the first color space of the seventh image data into the third color space.

4. The printing system according to claim 1, wherein the second image data created by the first color converter and the fourth image data created by the second color converter have the same resolution.

5. An image forming apparatus comprising:

an image forming unit that forms an image on a recording medium by using a plurality of color materials corresponding to a first color space;

an image reader that reads the image formed on the recording medium by the image forming unit in a second color space, which is different from the first color space;

a first color converter that creates second image data by converting a color space of first image data used for forming the image using the image forming unit into a third color space, a reproduction color gamut of the third color space being wider than a reproduction color gamut of the first color space and a reproduction color gamut of the second color space;

a second color converter that creates fourth image data by converting a color space of third image data, which is obtained as a result of reading an image by using the image reader, from the second color space to the third color space;

an eighth image data creator that creates eighth image data by calculating a difference between the second image data and the fourth image data;

a determining unit that detects, among pixels of an image represented by the eighth image data, a pixel having a pixel value which is greater than a predetermined reference value, and determines whether, among the pixels of the image represented by the second image data, the second image data and the eighth image data being obtained on the basis of the first image data, a pixel value of a pixel located at the same position as the pixel having the pixel value which is greater than the predetermined reference value is located inside or outside an input color gamut that is readable by the image reader;

a correction unit that corrects, among the pixels of the image represented by the eighth image data, a pixel value of a pixel which is determined to be located outside the input color gamut by the determining unit to a predetermined set value; and an output unit that outputs ninth image data obtained as a result of correcting the eighth image data by using the correction unit.

* * * * *